United States Patent
Peters et al.

(10) Patent No.: US 9,361,215 B2
(45) Date of Patent: Jun. 7, 2016

(54) MEMORY ALLOCATION IMPROVEMENTS

(71) Applicant: Apple Inc., Cupertino, CA (US)

(72) Inventors: Stephen C. Peters, Cupertino, CA (US);
Joseph Sokol, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 14/020,766

(22) Filed: Sep. 6, 2013

(65) Prior Publication Data
US 2014/0359248 A1     Dec. 4, 2014

Related U.S. Application Data

(60) Provisional application No. 61/829,951, filed on May 31, 2013.

(51) Int. Cl.
*G06F 12/02* (2006.01)
*G06F 9/50* (2006.01)

(52) U.S. Cl.
CPC .......... *G06F 12/0223* (2013.01); *G06F 9/5016* (2013.01)

(58) Field of Classification Search
None
See application file for complete search history.

(56) References Cited

U.S. PATENT DOCUMENTS

| | | | |
|---|---|---|---|
| 8,001,359 B2 | 8/2011 | Peak et al. | |
| 8,341,164 B1 | 12/2012 | Rosenberg et al. | |
| 2005/0097296 A1* | 5/2005 | Chamberlain | G06F 12/023 711/170 |
| 2008/0209153 A1* | 8/2008 | Schneider | 711/170 |
| 2010/0312984 A1* | 12/2010 | Robin et al. | 711/171 |
| 2013/0013884 A1 | 1/2013 | Ueno | |

OTHER PUBLICATIONS

Yves Younan et al., "Improving memory management security for C and C++", Apr. 1, 2010, 23 pages, vol. 1, Issue 2, Google Scholar.
Santosh Nagarakatte et al., "SoftBound: Highly Compatible and Complete Spatial Memory Safety for C", Jan. 2009, ACM SIGPLAN Notices—PLDI '09, vol. 44 Issue 6, pp. 245-258.
Markus Steinberger, "ScatterAlloc: Massively Parallel Dynamic Memory Allocation for the GPU", May 14, 2012, IEEE Xplore, Conference Location : San Jose, CA E-ISBN : 978-1-4673-2631-5, Print ISBN: 978-1-4673-2632-2, INSPEC Accession No. 13113690.
Advanced Micro Devices, Inc., "AMD64 Architecture Programmer's Manual vol. 2: System Programming", May 2013, Rev. 3.23, 664 pages.
Intel Corporation, "Intel 64 and IA-32 Architectures Software Developer's Manual", Mar. 2013, Order Number: 325462-046US, 3,044 pages.
Emery D. Berger, "Hoard: A Scalable Memory Allocator for Multithreaded Applications", Year: 2000, Cambridge, MA USA, 12 pages.
Jason Evans, "A Scalable Concurrent malloc (3) Implementation for FreeBSD", Apr. 16, 2006, 14 pages.

* cited by examiner

*Primary Examiner* — Daniel Tsui
(74) *Attorney, Agent, or Firm* — Blakely, Sokoloff, Taylor & Zafman LLP

(57) ABSTRACT

In one embodiment, a memory allocator of a memory manager can service memory allocation requests within a specific size-range from a section of pre-reserved virtual memory. The pre-reserved virtual memory allows allocation requests within a specific size range to be allocated in the pre-reserved region, such that the virtual memory address of a memory allocation serviced from the pre-reserved region can indicate elements of metadata associated with the allocations that would otherwise contribute to overhead for the allocation.

22 Claims, 13 Drawing Sheets

*Standard Memory Allocation Methods*

*Standard Allocation Block with Metadata*

MEMORY ALLOCATION IMPROVEMENTS

CROSS-REFERENCE

This application claims the benefit of provisional application Ser. No. 61/829,951, filed on May 31, 2013, which is hereby incorporated herein by reference.

BACKGROUND OF THE DISCLOSURE

User mode memory allocations for data processing systems can begin as kernel memory allocations. The operating system can then assign memory to applications by mapping virtual memory pages into the application's memory space. While an application can directly allocate page-sized blocks of virtual memory using one of several system level memory mapping functions available across various operating systems, finer grained memory allocations can be made for user mode applications via a variant of the malloc library function. Using a malloc function, a pointer to usable memory can be acquired without requiring the application developer to manually manage virtual memory allocations from the Kernel.

Malloc implementations as known in the art can vary from system to system. Classic malloc implementations begin by requesting a set of virtual memory pages from the kernel, and then returning pointers to free areas within the requested pages. In some implementations, the set of pages can be divided into memory blocks of varying sizes, and allocations of differing sizes can be services from specific blocks of memory. For example, allocations that are multiple pages in size can be allocated from a first memory block, while allocations that are less than a certain fraction of a page size can be allocated from a second memory block.

As the size of the allocations decrease, the number of allocations that can be serviced from a single block of memory increases. However, to manage a larger number of blocks requires maintaining a larger amount of metadata for each allocation. To know which areas within the pages are free at any given time, a malloc implementation maintains metadata about the size and location of each allocated block in use and any free space between blocks. As the program requires more memory, the malloc implementation requests more virtual memory pages, increasing the application's memory footprint. Metadata such as allocation chunk size data headers, or lists of previously allocated or free blocks can be used to manage the memory allocations; managing a large amount of metadata can result in extensive memory management overhead.

Extensive metadata overhead can be particularly seen in data processing systems that make extensive use of object oriented programming models. During runtime, the various objects can perform a large number of small memory allocations, de-allocations, and re-allocations during the life of an object. These repetitious allocation and de-allocation of small amounts of memory can ultimately lead to memory efficiency loss and performance degradation due to the metadata requirements and processing overhead of the large number of allocations.

SUMMARY OF THE DESCRIPTION

In one embodiment, a method at a memory manager for managing memory allocations in a data processing system is disclosed. The method can include requesting a block of memory from a reserved address range, to allocate memory to a process; dividing the block of memory into a set of memory lanes; and assigning a partition of a memory lane from the set of memory lanes to the process, responsive to an allocation request for a chunk of memory with a size within a size-range of a first allocator of the memory manager, wherein the address of the partition defines allocation metadata associated with the memory lane. In one embodiment, the allocation metadata can include a processor index for a processing device of the data processing system, a lane identifier for the lane of the block of memory used for the allocation, and a lane slice identifier. Additionally, an embodiment can adjustably determine the size range of the first allocator using various metrics, which can include the sizes and frequency of memory allocations that occur during a workload on the data processing system. In one embodiment, allocations that fall outside of the range of the allocator are deferred to an alternate allocator, which can service the allocation request, and store metadata for serviced memory allocations in a conventional (e.g., per-chunk) metadata storage block or set of blocks.

In one embodiment, non-transitory computer-readable medium stores instructions to perform operations at a memory manager in a data processing system. An embodiment can include instructions to perform operations to receive an allocation request for a memory allocation of a specific size that falls within an allocator size-range of an allocator of the memory manager for the data processing system. Responsive to the request, the allocator can round the size of the allocation to a rounded size that is equal to the size of a memory lane that is larger than the size of the allocation request. The rounded memory lane can be used to derive a lane value from the rounded size, and the requesting processor can be used to provide an index into a memory magazine from which the allocation request can be serviced. The memory lane and magazine index can be used to atomically dequeue an address from a queue of free partitions, to service the memory allocation request. In one embodiment, the computer-readable medium stores additional instructions to perform further operations, which use the memory lane and magazine index to service a request to free an allocation, by placing an address to be freed on the queue of free partitions for a memory lane and magazine.

In one embodiment, a data processing system having multiple 64-bit processor cores, and a non-transitory memory device storing instructions, the instructions to perform operations including the operations described above.

The above summary does not include an exhaustive list of all aspects of the present invention. It is contemplated that the invention includes all systems and methods that can be practiced from all suitable combinations of the various aspects summarized above, and also those disclosed in the Detailed Description below.

BRIEF DESCRIPTION OF THE DRAWINGS

The following description includes discussion of figures having illustrations of example implementations of the various embodiments. Accordingly, the figures should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein each describe various embodiments and implementations of the invention, and do not necessarily all refer to the same embodiment, though embodiments are not necessarily mutually exclusive. In the accompanying figures, like references indicate similar elements.

DETAILED DESCRIPTION

In embodiments described herein, a memory manager manages memory allocations with reduced metadata processing and storage by representing multiple elements of metadata using the virtual memory address of the allocation. In one embodiment, multiple blocks of virtual memory can be pre-reserved based on a bit assignment between the memory address bits and the metadata bits, and memory allocations can be serviced using virtual memory addresses that correspond with the appropriate address bits that describe the allocation. In one embodiment, blocks of virtual memory having specific addresses are reserved, and the reserved virtual address space can be divided into equal sized lanes of a pre-determined size, and memory allocations of specific sizes can be serviced from specific lanes.

In one embodiment, multiple memory allocators can exist within the memory manager, and each allocator can be tuned to manage memory allocations within a specific size range. The size range for the size of the memory allocators can be determined heuristically based on the pattern of memory allocations that occur on the data processing system over time. Initial size ranges can be pre-determined based on the planned usage model of a specific data processing system. In one embodiment, virtual memory addresses can be reserved such that a first set of address bits can be used to indicate the processor core for which the allocation is made, and a second set of address bits can indicate which block of addresses out of several blocks of addresses are used to service the allocation. Additionally, when the memory block is sub-divided into lanes, the address can indicate which of the lanes is used to service the allocation.

Exemplary Data Processing System

Figure 1A:
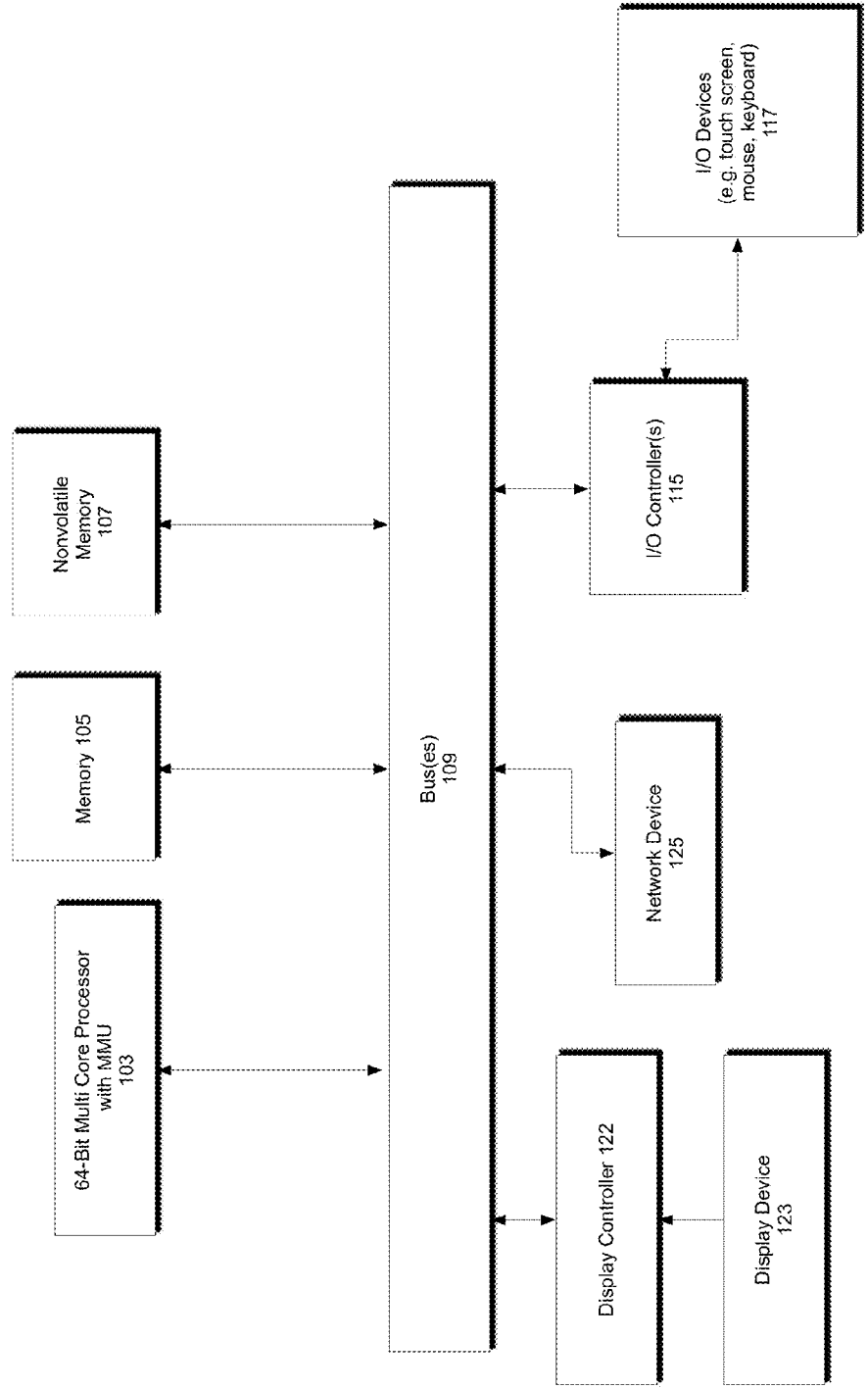
FIG. 1A and FIG. 1B are a block diagram of an exemplary data processing system 100, which features embodiments described herein.
Figure 1B:
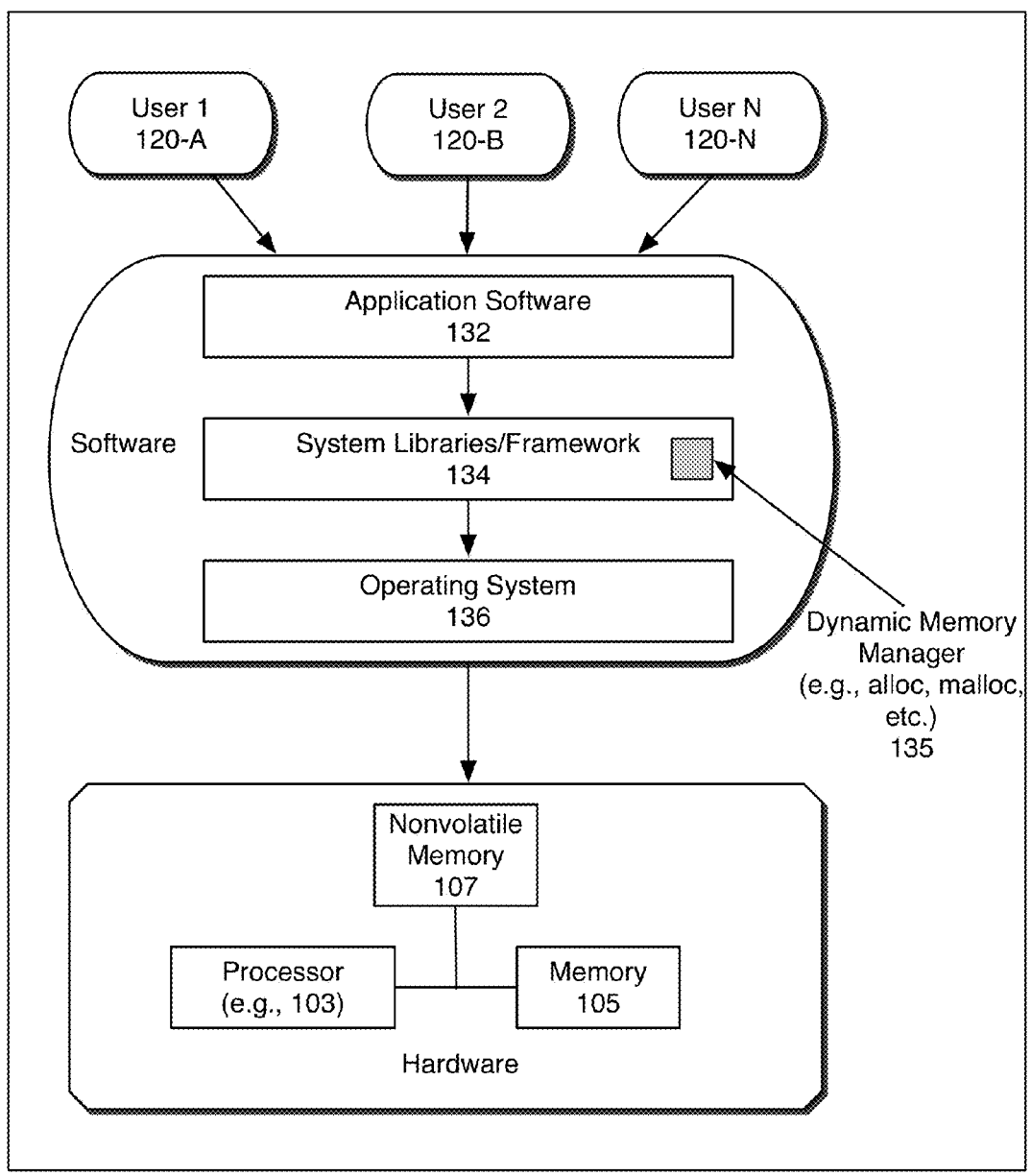

FIG. 1A and FIG. 1B are a block diagram of an exemplary data processing system 100, which features embodiments described herein. The data processing system 100 includes one or more buses 109, which serve to interconnect the various components of the system. One or more 64-Bit multi-core processing devices 103, each containing one or more processor cores and memory management units can coupled to the one or more buses 109 as is known in the art. Embodiments disclosed herein can be used to manage allocations to Memory 105, which can be volatile Sequential DRAM, non-volatile RAM or can be flash memory, phase change memory, or other types of volatile or nonvolatile semiconductor memory. Memory 105 is coupled to the one or more buses 109 using techniques known in the art.

The data processing system 100 can also include nonvolatile memory 107 which can be a hard disk drive or a flash memory or a magnetic optical drive or magnetic memory or an optical drive or other types of memory systems which maintain data after all power is removed from the system. The nonvolatile memory 107 and the memory 105 can both couple to the one or more buses 109 using known interfaces and connection techniques. A display controller 122 is coupled to the one or more buses 109, to receive display data to be displayed on a display device 123. The data processing system 100 can also include one or more input/output (I/O) controllers 115 that provide interfaces for one or more I/O devices such as one or more mice, touch screens and touch pads, joysticks, and other input devices, including those known in the art. Additionally, one or more network interfaces 125 can also be coupled to the one or more buses to provide access to one or more networks.

It will be apparent from this description that aspects of the present invention can be embodied, at least in part, in software. That is, embodiments described herein can be carried out in a data processing system (e.g., data processing system 100) in response to its processor executing a sequence of instructions. FIG. 1B is a block diagram illustrating exemplary software architecture and a partial hardware view showing certain hardware components of the data processing system 100. In one embodiment, software instructions for execution by a processor (e.g., one or more 64-Bit multicore processors 103) of the data processing system 100, or a remote data processing system coupled over a network, is contained in a non-transitory memory, such as the memory 105 or the non-volatile memory 107 or a combination of such memories, where each of the memories is a form of machine readable, tangible storage medium. In various embodiments, hardwired circuitry can also be used in combination with software instructions to implement the present invention, such as circuitry embedded within various components of the hardware of the data processing system 100. Thus the embodiments are not limited to any specific combination of hardware circuitry and software or to any particular source for the instructions executed by the data processing system.

As shown in FIG. 1B, a data processing system including the various embodiments can be a multi-user data processing system in which 1 to N users (e.g., User 1 120-A, User 2, 120-B, User N 120-N) access application software 132 through a user interface, which can be a user interface such as Finder, of the Mac OSX operating system from Apple Inc. of Cupertino, Calif., or user interface provided by other operating systems. Application software 132 can use system libraries or frameworks 132 as abstractions to functionality exposed by the core levels of the operating system 136, which includes the system kernel. An embodiment of a dynamic memory manager 135 can be included within the system libraries to allow software developers to utilize dynamically allocated memory.

In one embodiment, the dynamic memory manager 135 can include multiple memory allocators that use multiple memory allocation algorithms that are specific to allocations of a certain size. For example, a first memory allocator can be tuned for memory allocations that are larger than the size of a frame of physical memory, while a second memory allocator can be tuned for allocations that are small fractions of a page. The size range of the memory allocations that are serviced by the various allocation methods can be determined heuristically based on the pattern of memory allocations that occur on the data processing system over time, and initial limits can be pre-determined based on the planned usage model of a specific data processing system.

For example, data processing systems that utilize software applications that are heavily object oriented can expect a specific pattern of memory allocations based on the objects most frequently used by system level, or commonly executed software. During runtime, the software objects can repeatedly perform a large number of memory allocations and de-allocations of a specific size (e.g., 512 bytes or less). The memory allocations can be serviced from blocks virtual memory allocated by the operating system 136, and parceled into small allocations to be distributed to individual processes. The data processing system 100 can utilize a 64-bit processor (e.g., 103), which allows a large range of virtual memory address ranges. Using this additional virtual memory space, specific virtual memory address ranges can be used to service memory allocation requests with improved performance and reduced overhead. To reduce memory management overhead, memory allocations within a pre-defined size range can be serviced from a specific set of virtual memory addresses, and various bits of the address can be used to substitute for various elements of metadata that would otherwise have to be stored separately.

Virtual Memory Allocation Maps 32-bit processor architecture generally refers to a processor whose registers are 32 bits wide and which is generally designed to manage data 32-bits at a time. Likewise, a 64-bit architecture usually has registers that are 64 bits wide and the processor is generally designed to manipulate 64-bits of data at a time. A processor is typically designed so that the contents of a single register can store a virtual memory address. A 32-bit processor's virtual address space is usually limited to 4 Gigabytes ($2^{32}$) because that is the maximum amount of memory can be addressed with a 32-bit memory address. However, the virtual address space of a 64-bit processor can be substantially larger than 4 GB.

A processor with support for a full 64-bit address space can address up to 16 Exabytes ($2^{64}$) of memory. Although many 64-bit processors support less than the maximum possible range of addresses, implementations are available which support at least a 48-bit memory address, which allow up to 256 Terabytes ($2^{48}$) of memory to be addressed. A 256 Terabyte address range allows the addressing of significantly more virtual memory than was available using standard or extended addressing methods available on 32 bit processors.

Figure 2:
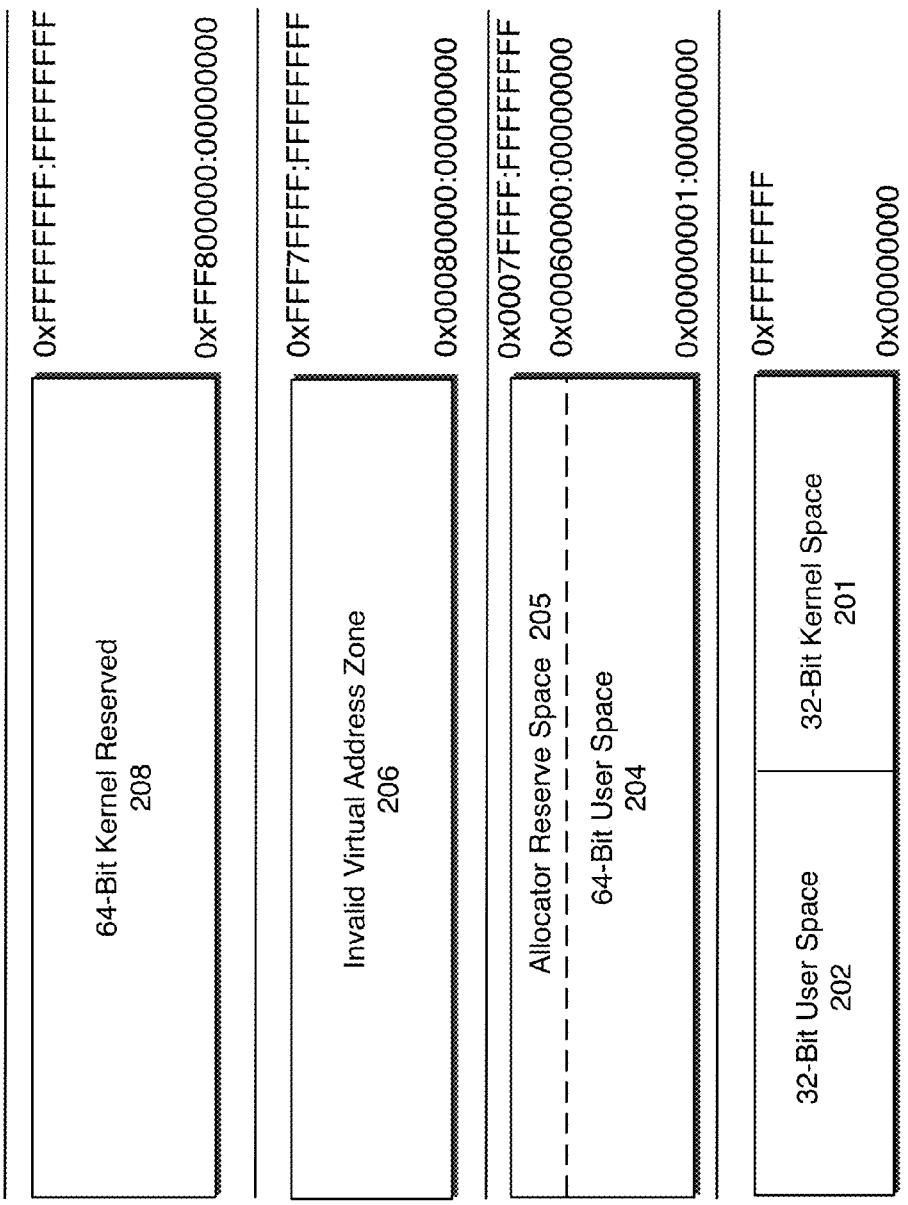
FIG. 2 illustrates an exemplary 64-bit virtual memory layout, according to an embodiment.

FIG. 2 illustrates an exemplary 64-bit virtual memory layout, according to an embodiment. The virtual memory layout shown in FIG. 2 can be divided into four memory sections, a 32-bit section (e.g., 202, 201), a 64-bit user space (e.g., 204, 205), a 64-bit kernel space 208, and in some 64-bit processor implementations, an invalid virtual address zone 206. 32-bit memory section 201 can be reserved for use by the kernel of a 32-bit operating system, while a second memory section 202 can be made available to 32-bit user applications. The size of the first memory section 201 and second memory section 202 can be up to 4 Gigabytes, which is the total virtual memory space in a 32-bit system. The system can support overlapping memory spaces by loading page tables or registers associated with page tables with appropriate entries whenever the system switches from user mode to kernel mode. Additionally, some 32-bit processors support an extended paging mode (e.g., Physical Address Extension, PAE) which allows 32-bit processors to access physical addresses beyond the 32-bit address limit. However, when using PAE on a 32-bit processor, the virtual memory address range may still be limited to 32-bit addresses.

In 64-bit architectures, memory section 204 can be reserved for use exclusively use by user applications. The 64-bit kernel can then reside in a reserved high memory area, such as memory section 208, which is disjoint from memory section 204. An embodiment of the memory manager (e.g., dynamic memory manager 105) can reserve an allocator reserve space 205 above the 64-bit user space 204 for use in allocating memory requests for user space applications. Placing the allocations in a specific region of virtual memory allows the allocator to reserve specific memory regions for specific purposes. For example, each processor core can be allocated a specific region of memory, avoiding contention between multiple processors as they attempt to perform memory allocations to the same region of memory. When the region of memory dedicated to each processor is defined in advance, metadata regarding the ownership of a memory allocation can be stored in the memory address of the allocation, instead of in a memory allocation descriptor.

In some processor implementations, memory section 206 can be designated as an invalid virtual memory address zone. This zone can occur for 64-bit processors that do not contain a full 64-bit address space. The size of the invalid virtual address zone is dependent upon the number of address bits supported for virtual memory translation into physical memory. Early implementations of 64-bit processors having the Intel X86 instruction set (e.g., X86-64) supported a 48-bit address space, where bits 63 through 48 must be copies of bit 47. Embodiments disclosed herein are not so limited; the exemplary 64-bit Virtual Memory Address space of FIG. 2 is addressable by a processor having a 52-bit virtual address space. However, implementations may have to take into account the invalid virtual address zone 206 when defining allocator reserve space 205.

Figure 3A:
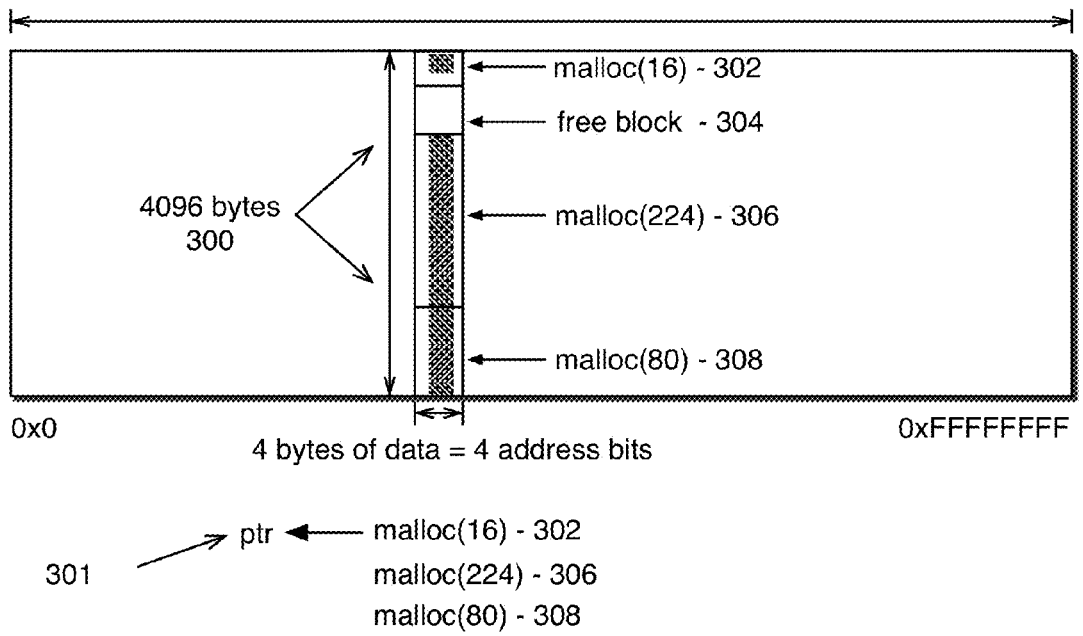
FIG. 3A and FIG. 3B are block diagrams of a standard memory allocation as performed for a 32-bit process using a standard method of metadata tracking, according to an embodiment.
Figure 3B:
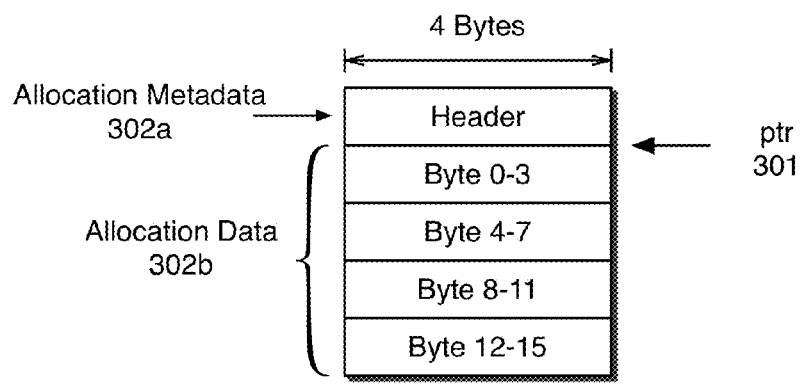

FIG. 3A and FIG. 3B are block diagrams of a standard memory allocation as performed for a 32-bit process using a standard method of metadata tracking, according to an embodiment. An embodiment can use this allocation method for 32-bit applications, or for very large memory allocations in 32-bit or 64-bit memory space when allocation metadata is a small percentage of the total allocation. While embodiments employ more advanced allocation techniques than those shown in 3A and 3B, a standard, or fallback method of memory allocation is shown for purposes of comparison. In the exemplary illustration of FIG. 3A, a contiguous 4 Kilobyte physical memory page (4096 bytes) 300 is illustrated as a column of memory mapped within a 32-bit virtual address space. The column of data is represented with a 4 bytes alignment, which is 32-bits, and is equivalent to a 32-bit machine word. When an allocation function (e.g., malloc, alloc, new, etc.) executes successfully, a pointer 301 to the first free address of the requested memory allocation can be returned to the requesting function.

For example, a call 302 to the malloc function with a size of 16 bytes can be serviced, and a pointer to 16 byes of memory can be returned. In a standard malloc implementation, when the next memory allocation is requested, such as an allocation request 306 for 224 bytes of data, the next free block large enough to service the allocation is returned, so that empty blocks of memory are re-used for allocations instead of allocating new memory. This method can leave free blocks, such as free block 304 in between memory allocations when memory is freed, which can result in memory fragmentation. For example, a memory allocation 308 for 80 bytes may not be able to be allocated without requesting additional virtual memory, because there are no free blocks (e.g., free block 304) that are large enough to fit the allocation.

In the exemplary illustration of FIG. 3B, a standard allocation block, including the allocation metadata is shown. In one implementation, a 16-byte allocation 302 can use at least 20 bytes of data; at least 4 bytes of allocation metadata 302a can be used for header information for the 16 bytes of allocation data 302b. Allocation metadata can include data such as the size of the allocation, the processor for which the allocation was created, the allocation status of the allocation block, etc. Embodiments of the memory manager described herein can avoid the storage of allocation metadata 302a for a subset of individual allocations by performing those allocations from a reserved section of user space memory available in address space addressable by 64-bit processors.

Figure 4A:
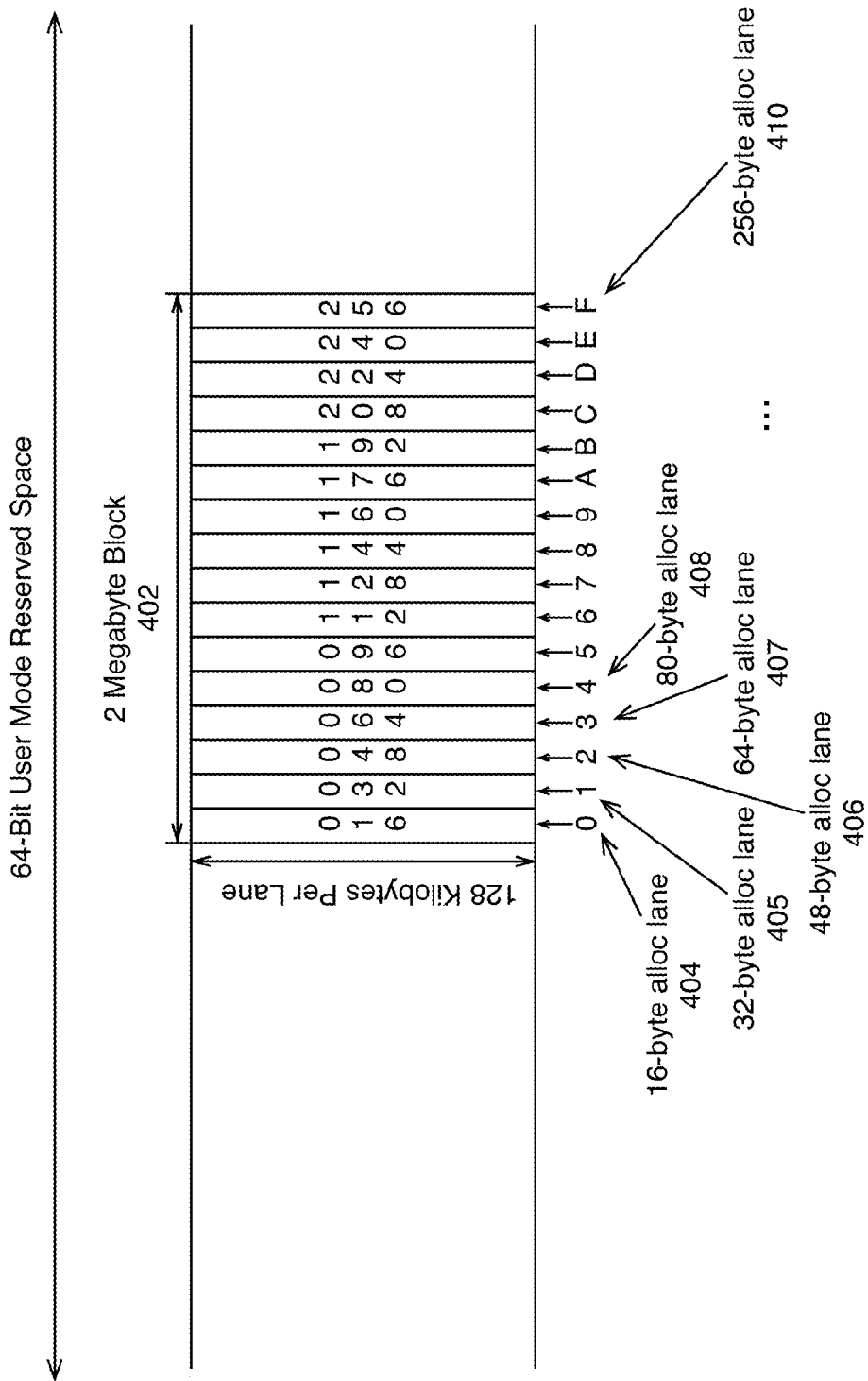
FIGS. 4A through 4C are block diagrams illustrating memory maps for 64-bit allocations, according to an embodiment.
Figure 4B:
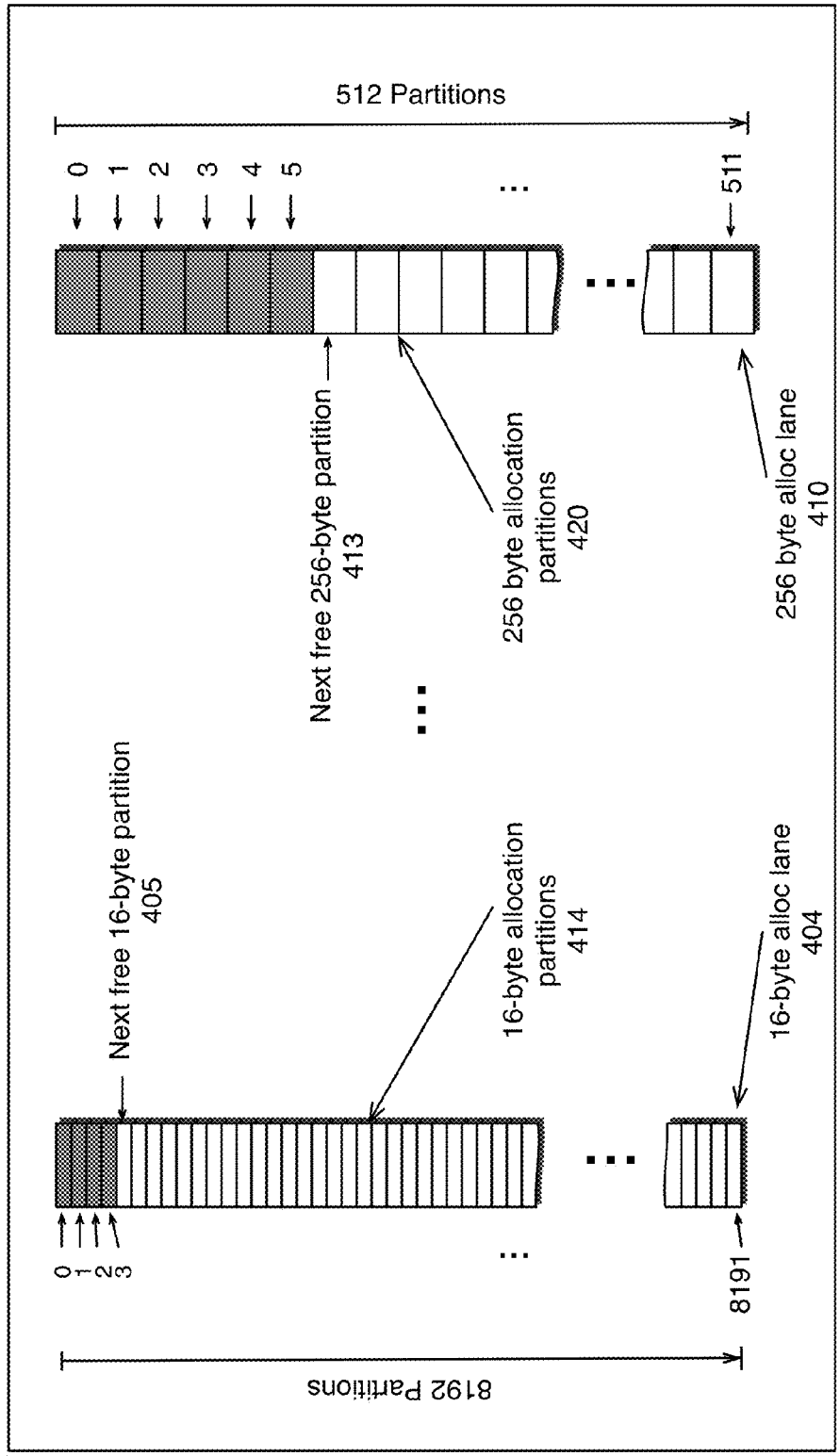
Figure 4C:
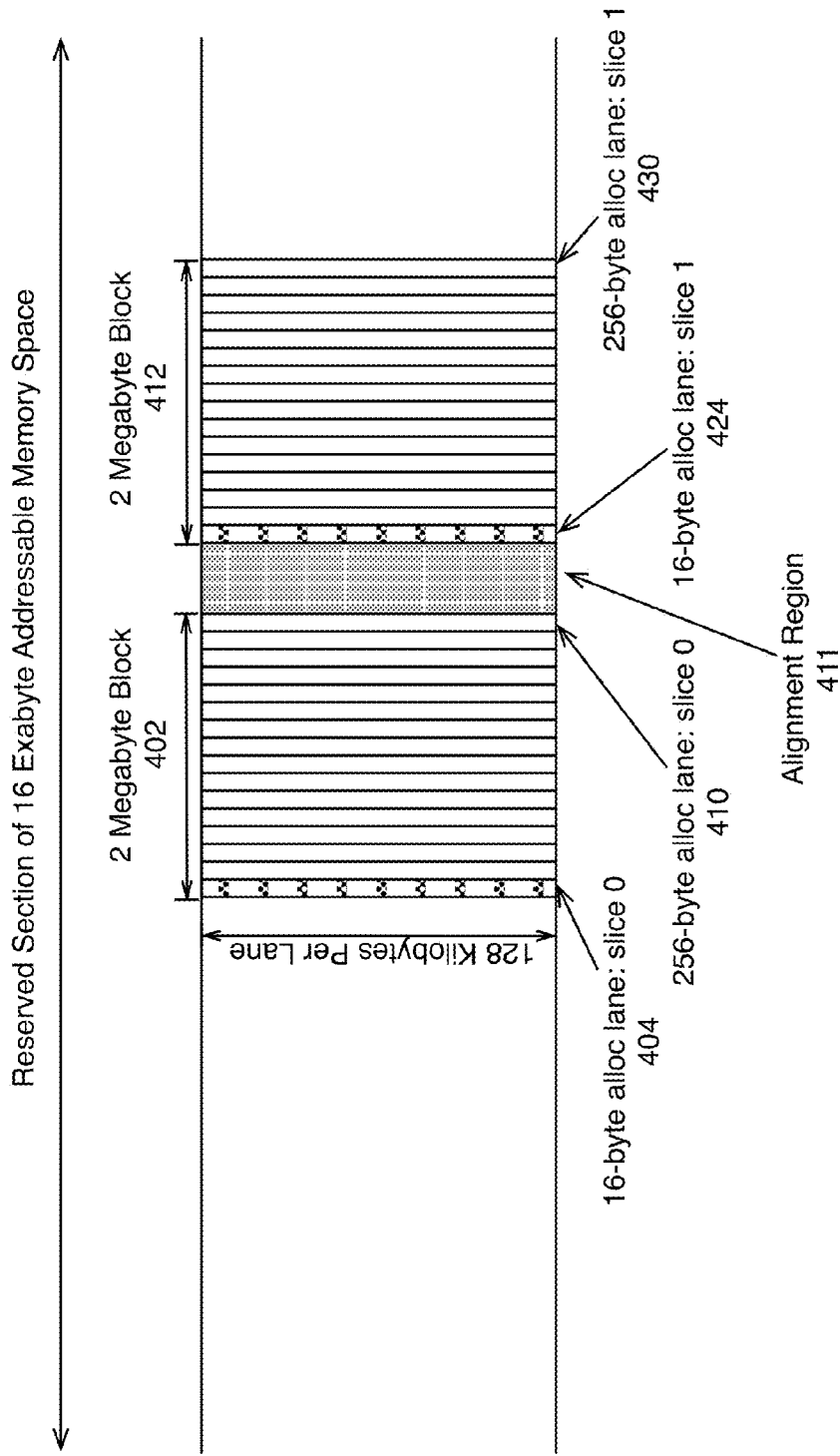

FIGS. 4A through 4C are block diagrams illustrating memory maps for 64-bit allocations, according to an embodiment. An embodiment can reserve specific addresses in 64-bit memory space (e.g., allocator reserve space 205 of FIG. 2) from which to perform a specific set of memory allocations. In one embodiment, memory allocations within differing size ranges can use different allocation methods that can be optimized for allocations of the size range. In the exemplary illustration of FIG. 4A, allocations between 16 bytes and 256 bytes are serviced from the reserved space, though embodiments are not so limited. The precise range of memory allocations serviced by an embodiment can be determined heuristically via an examination of empirical data gathered during workload analysis for the platform, which is discussed further in FIG. 6.

In one embodiment, a memory manager can reserve a 2 Megabyte block of data 402, which can be a single physical frame, or an aligned block of smaller physical pages. An embodiment can then divide the data block 402 can then divide the block of memory into a set of memory lanes. In one embodiment, the block can be divided into 16 equally sized memory lanes, each 128 Kilobytes in length. Each lane can be dedicated to allocations of a specific size, such that allocations of a first size are serviced from a first lane, and allocations of a second size are serviced from a second lane. In one embodiment, allocations from 16-bytes to 256-bytes are serviced from the lanes of the data block 402.

When an allocation request is received, an embodiment can assign a partition of a lane from the set of memory lanes to the requesting process, responsive to the allocation request for a chunk of memory. In one embodiment, the smallest allocation request that can be serviced is 16-bytes, and each successive lane can be dedicated to allocations of increasing size, in 16-byte increments. For example, a 16-byte allocation request can be serviced from the 16-byte allocation lane 404, which is illustrated as lane 0x0 in FIG. 4A. Additionally, lane 0x1 can be a 32-byte allocation lane 405 for allocations between 17-bytes and 32-bytes; lane 0x2 can be a 48-byte allocation lane 406, for allocations between 33-bytes and 48-bytes; lane 0x3 can be a 64-byte allocation lane 407, for allocations between 49-bytes and 64 bytes, and lane 0x4 can be an 80-byte allocation lane, for allocations between 65-bytes and 80-bytes. Allocations can continue in this manner through lane 0xF (lane 15), which can be a 256-byte allocation lane 410. In one embodiment, incoming allocations are rounded up to the maximum size of the lane, such that each allocation in a lane is an equal sized allocation, which minimizes issues created by fragmentation. Each lane can be partitioned into partitions that are equal to the size of the allocation serviced by the lane.

In the exemplary illustration of FIG. 4B, a partitioning of the 16-byte alloc lane 404 and a partitioning of the 256-byte alloc lane 410 is shown. The 16-byte alloc lane 404 can be partitioned into 8192 allocation partitions 414, each partition 16-bytes. When a request for a new 16-byte allocation is received, a pointer to the next free 16-byte partition 405 can be returned. For the 256-byte alloc lane 410, an embodiment can manage allocations via a set of 512 allocation partitions, 420, each partition 256 bytes. In one embodiment, the addressing granularity of 16-bytes is maintained for partitions larger than 16 bytes. Accordingly, when a request for a new allocation is received, a pointer to the next free 256-byte partition 413 can be returned to the requesting process, but the pointer will still be addressed in increments of 16-bytes. This means that the first partition returned will be partition 0, while the second partition returned in the 256-byte lane will be partition 0x10 (e.g., partition 16), as a 256-byte allocation consumes 16 of the 16-byte partitions.

In one embodiment, no metadata as to the size and allocation status of a block is stored with each allocation. Instead, a list of free blocks can be maintained, where a queue of pointers to each free block can be maintained as an array of queues. The metadata for each 2 Megabyte block of data 402 has a fixed size, and a minimal amount of data is maintained to track the list of free blocks for each lane, allowing a single block of metadata to be allocated for each block of data 402.

In the exemplary illustration of FIG. 4C, an additional 2 Megabyte block of virtual memory 412 has been allocated when any one of the lanes in the first 2 Megabyte block 402 is filled. In one embodiment, each lane can store up to 128 Kilobytes of data. When a lane becomes full, an additional slice of the lane can be created in a new block of virtual memory, such as the 2 Megabyte block 412. For example, once 8192 16-byte allocations have been made to slice 0 of the 16-byte allocation lane 404, a new block (e.g., 2 Megabyte block 412) can be allocated, and a second slice (e.g., 16-byte allocation lane: slice 1 424) can be created for the next 16-byte allocation. The remaining lanes in the block can be left unallocated until they are required. However, additional lanes can be allocated in the new 2 Megabyte data block 412 without requesting an additional block of virtual memory from the operating system. Accordingly, a virtual memory request from the operating system is performed only once per slice of lanes, reducing the processing overhead for lane allocations. An alignment region 411 exists between the first set of slices in block 402, and the second set of slices in block 412 due to the nature of the addressing scheme. Accordingly, the memory blocks containing the various slices may not be contiguous in virtual memory.

In this manner, an embodiment can manage each lane, from the 16-byte alloc lane 404 to the 256-byte alloc lane 410 by allocating an additional block of memory for new lane slices whenever any lane in an existing block of memory fills. As with the 16-byte alloc lanes (e.g., 404, 424), each lane, though the 256-byte alloc lanes (410, 430) is partitioned into as quantized partitions, and those partitions are used to service allocations until every partition in the lane is full. At that point, a new slice of lanes is created in a new block (e.g., 2

Megabyte block 412 for slice 1 allocations) and the memory allocator can continue to process allocations in the new lane slice.

Using the memory blocks, memory lanes, partitions of memory lanes, and slices of memory lanes, allocations can be serviced using quantized and regimented addresses that allow data for each allocation to be determined by the virtual memory address of the allocation. Additionally each processor core on the system can have a dedicated allocation space from which allocations from processes on that particular processor core is allocated. In one embodiment, each processor as a "Memory Magazine," in addition to the "Memory Lanes" for each allocation, and the "Lane Slices" for additional lanes of the same size. Using a memory magazine for each processor allows allocations to be performed without locking the memory block, as only a single processor core will be accessing allocations within the processor's memory magazine.

This contrasts with a standard memory allocation implementation, in which global metadata, such as a global free list, is locked and unlocked to protect against corruption during concurrent access by multiple processors. In the event a process has memory allocated in a magazine of a first processor, and desires to share memory with a process, hardware instructions can be used without requiring software synchronization of the data. An atomic compare and swap operation can be performed using processor instructions, and the virtual memory mappings of the processes can be fixed up by the virtual memory system of the operating system to map addresses between the magazines without requiring specialized software locking routines.

Exemplary Address Determination and Metadata Bitfields

Figure 5:
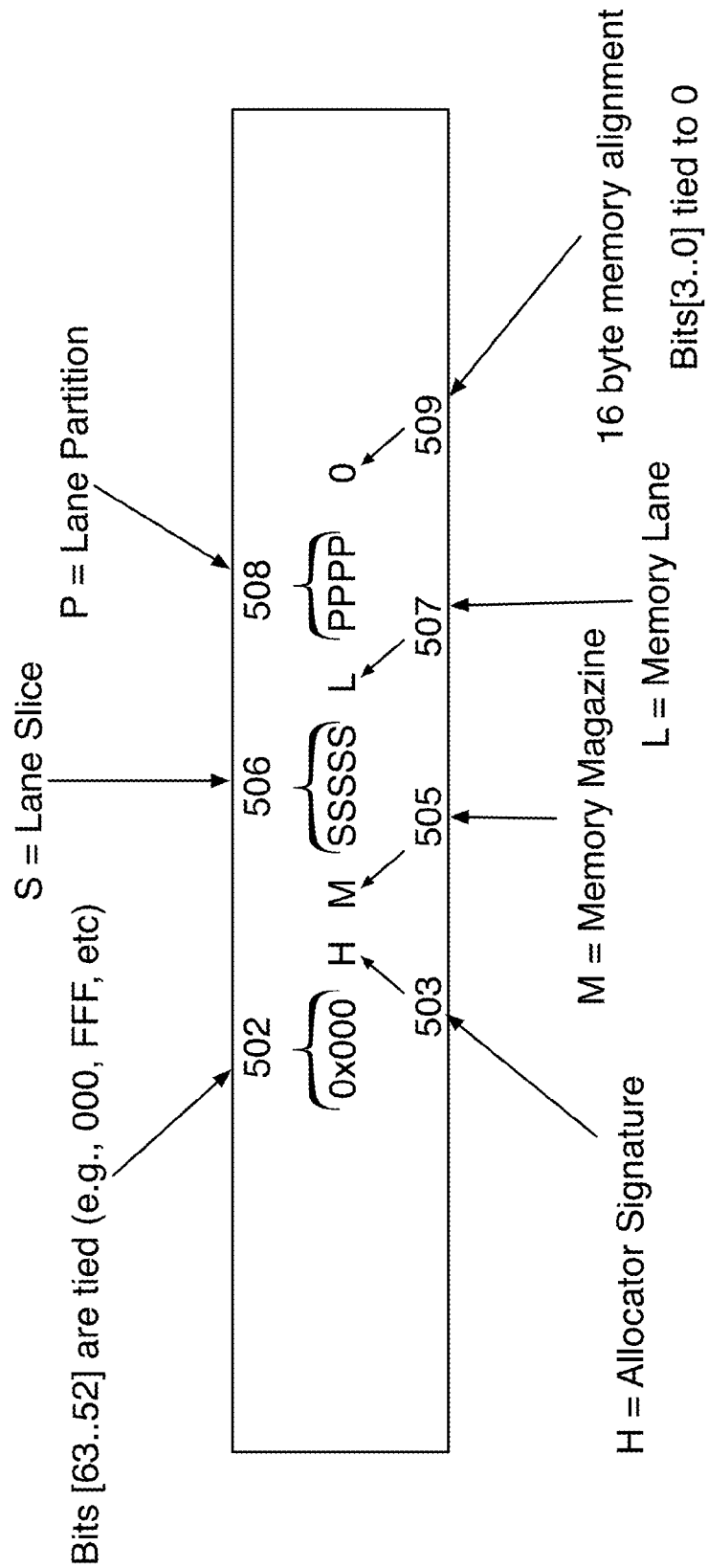
FIG. 5 is a diagram illustrating an address encoding and decoding scheme for virtual memory address bits, according to an embodiment.

FIG. 5 is a diagram illustrating an address encoding and decoding scheme for virtual memory address bits, according to an embodiment. Not all 64-bit processors implement a full 64-bit address space for virtual memory, and some number of the most significant address bits 502 will not be available to a process. In such processors, an invalid virtual address zone 206 as shown in FIG. 2 exists, where the size of the zone is dependent upon the number of supported address bits. While most processors supporting an instruction set from the Intel Corporation of Santa Clara, Calif. support at least a 48-bit address space, embodiments are not limited to a particular instruction set, or a particular processor implementation. In one embodiment, a 64-bit processor implementation has a 52-bit virtual memory address space, and bits 63 to 52 (e.g., most significant bits 502) are sign extension bits that must be duplicates of bit 51, or the processor implementation will flag the address as invalid.

In one embodiment, a memory allocator of a memory manager can secure a block of addresses near the top of user mode address space by the use of an allocator signature 503. The "H" allocation signature 503 can be one of 16 values representable by the four bits of address space between, for example, bits 51 and 48 of the virtual memory address space. In one embodiment, multiple allocators supporting multiple allocation ranges can exist, each allocator having a different signature in the allocator signature field 503. An embodiment can support multiple memory magazines, which can each be indicated by a set of bits following the allocator signature, such as the set of bits 505 marked "M". Using four magazine bits for the memory magazine 505 for each processor allows support for up to 16 processors per allocator. Support for additional processors can be had using additional allocators. In one embodiment, multiple allocators using the same allocator range are possible, to allow support for a number of magazines in excess of 16 memory magazines 505.

In one embodiment, the lane slice 506 can be indicated by the next set of bits. As the range of virtual addresses offered by any one lane is exhausted, an additional set of lanes can be introduced. These additional lanes can be numbered sequentially as lane slices and are identified by the bits 506 denoted with the "S" indicator. The memory lane bit value "L" 507 can indicate the lane in which the allocation is made. Accordingly, the memory manager need not retain separate size metadata for the size of each memory allocation, as the lane 507 in which the allocation is placed reflects the size of the allocation. Within the individual lanes, the lane partition bits "P" 508 can indicate a lane partition within a set of a lane partitions for each lane, which can, in one embodiment, follow the memory lane indicator L 507. In one embodiment, the minimum allocation granularity is 16-bytes. Where each allocation is 16-byte aligned, the four least significant bits of address space 509 are constrained to zero. According to an embodiment, a set of sample using the bit mapping of FIG. 5 can result in the allocations shown in Table 1, below.

TABLE 1

Exemplary addresses containing allocation metadata.

| Allocation Number | Allocation Request | Allocator Signature 503 | Memory Magazine 505 | Lane Slice 506 | Memory Lane 507 | Lane Partition 508 |
|---|---|---|---|---|---|---|
| 1 | malloc(16) | 0x0006 | 3 | 00000 | 0 | 0000 |
| 2 | malloc(16) | 0x0006 | 3 | 00000 | 0 | 0001 |
| 3 | malloc(16) | 0x0006 | 3 | 00000 | 0 | 0002 |
| 4 | malloc(48) | 0x0006 | 3 | 00000 | 2 | 0000 |
| 5 | malloc(48) | 0x0006 | 3 | 00000 | 2 | 0003 |
| 6 | malloc(48) | 0x0006 | 3 | 00000 | 2 | 0006 |
| 7 | malloc(256) | 0x0006 | 3 | 00000 | F | 0000 |
| 8 | malloc(256) | 0x0006 | 3 | 00000 | F | 0010 |
| 9 | malloc(256) | 0x0006 | 3 | 00000 | F | 0020 |

The addresses above indicate memory allocation requests using a malloc function, which request multiple memory allocations of 16, 48, and 256 bytes for processor core 3, using an allocator with an allocator signature 503 of 0x6 (e.g., bit field 0110). The first allocation request for 16 bytes results in an allocation in the first partition of the first memory lane, and, in one embodiment, returns a pointer to a pre-reserved virtual memory address of 0x000630000000000. For an embodiment using this exemplary address implementation, it is known that the next 16-byte allocation will result in a pointer to a pre-reserved virtual memory address of 0x0006300000000010, and the next 16-byte allocation address will begin at 0x0006300000000020.

As shown in Table 1, an embodiment can direct an incoming 48-byte allocation request to the 48-byte lane, as indicted by the memory lane 507 value of 0x0002 for allocation 4 in Table 1 above. In one embodiment, the lane partitions are addressed according to their byte offset in the lane, such that the first 48-byte lane partition begins at 0x0, the second 48-byte partition begins at offset 0x0003, while the first 48-byte partition begins at 0x0006. Likewise, an embodiment can begin allocation 8, the second 256-byte allocation in Table 1 at partition offset 0x0010 within memory lane 0x2, while allocation 9, the third 256-byte allocation, begins at partition offset 0x0020.

Allocator embodiments at not limited to byte ranges between 16-bytes and 256-bytes, though allocations of a small size can benefit the most from removing the per-block metadata allocation. The range of a specific allocator can be determined based on an analysis of memory allocation data as observed on a target data processing system under a target workload, such that, for example, mobile data processing systems can have allocators tuned for a specific range that differs from server data processing systems.

Figure 6:
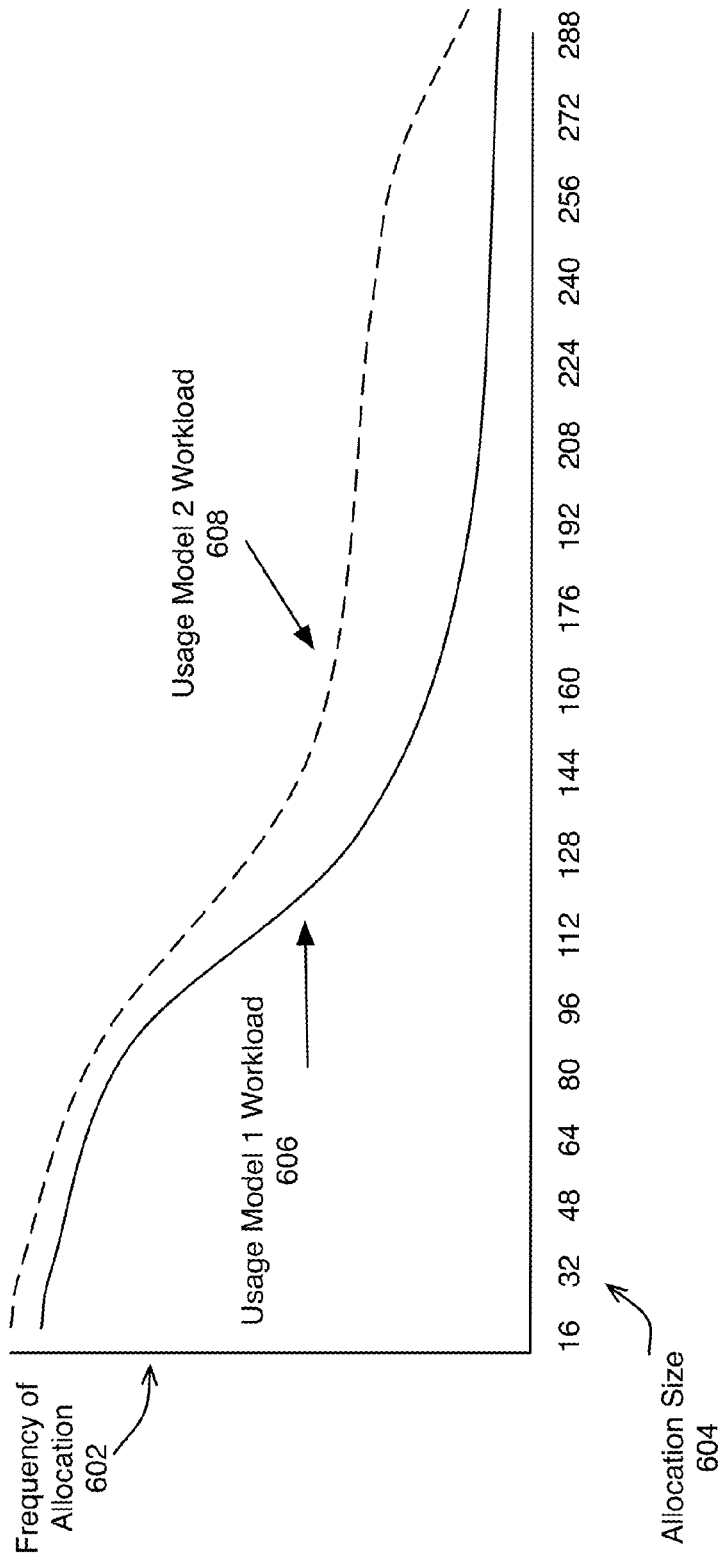
FIG. 6 is an exemplary illustration of an allocation frequency graph that can be used to determine the allocator ranges for a data processing system, according to an embodiment.

FIG. 6 is an exemplary illustration of an allocation frequency graph that can be used to determine the allocator ranges for a data processing system, according to an embodiment. An embodiment can be tuned for a workload by gathering allocation data for allocation performed by the data processing system's operating system and applications when performing typical activities for the data processing system. For example, a workload for a first usage model 606 can demonstrate that a high frequency of allocation can be found for memory allocations in the 16-byte to 128-byte range, and an embodiment of the memory allocator can be tuned to use the allocation methods disclosed herein on allocations between 16 and 128-bytes. For a second workload for a second usage model 608 can suggest that an allocator for a data processing system can be tuned to handle memory allocations between 16-bytes and 256-bytes.

In one embodiment, an allocator can be adjustably determined using the metrics. The adjustment can occur during runtime based on allocation statistics gathered and analyzed by the memory manager, such that if an allocator is underutilized due to the size-range serviced by the allocator, and an alternate size-range would be more appropriate for the workload experienced by the data processing system, the allocator can adopt the alternate size-range.

Exemplary Allocation and Metadata Logic Flow

The processes depicted in the figures that follow are performed by processing logic that comprises hardware (e.g. circuitry, dedicated logic, etc.), software (as instructions on a non-transitory machine-readable storage medium), or a combination of both hardware and software. Although the processes are described below in terms of some sequential operations, it should be appreciated that some of the operations described can be performed in a different order. Moreover, some operations can be performed in parallel rather than sequentially.

Figure 7:
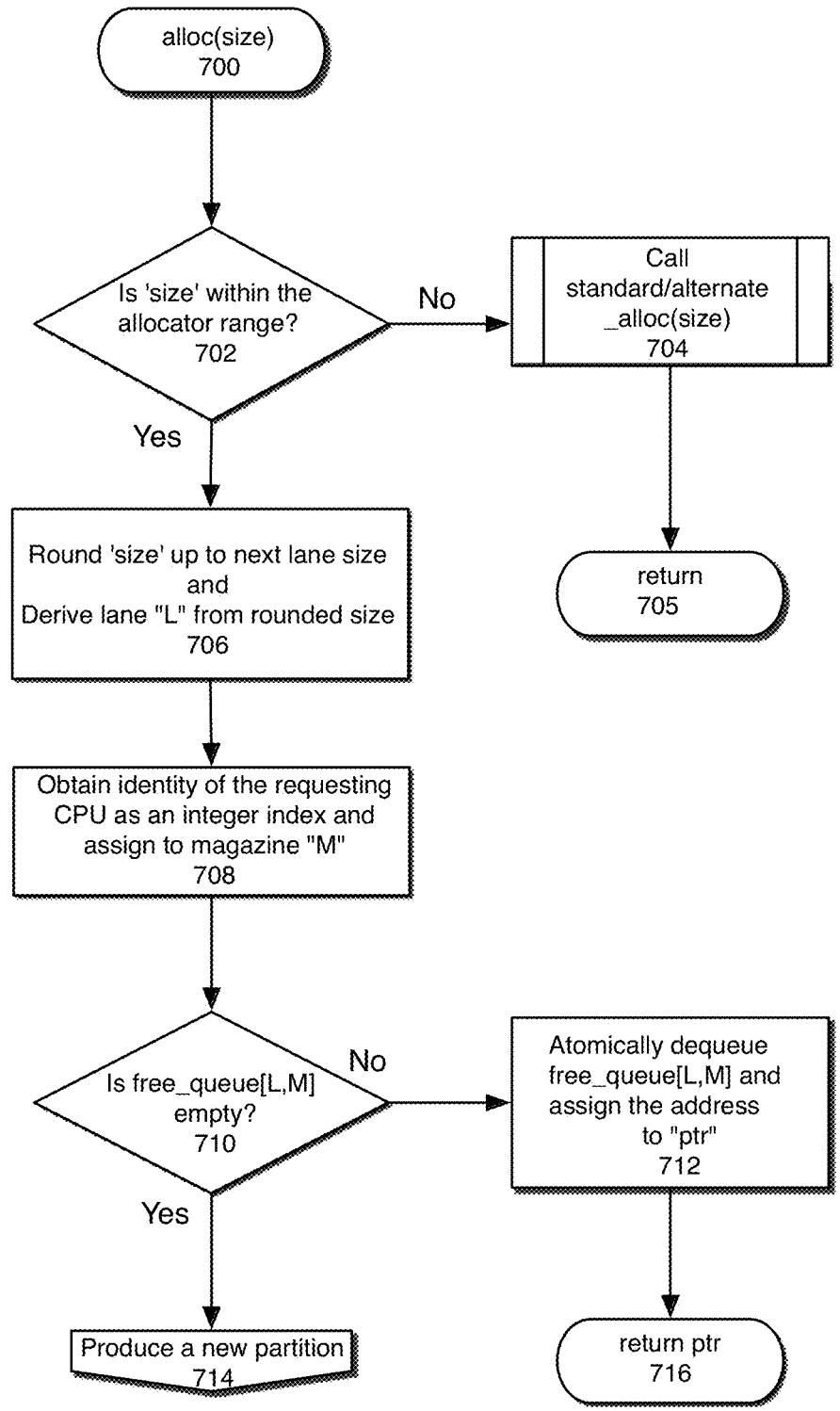
FIG. 7 is a flow diagram of metadata management during user memory allocation, according to an embodiment.

FIG. 7 is a flow diagram of metadata management during user memory allocation, according to an embodiment. In one embodiment, an allocator for a memory manager can receive 700 a call to allocate a chunk of memory having a specific size. The allocator can then perform an operation 702 to determine if the request size is within the size range serviced by the allocator range. If the allocation is outside of the allocation range serviced by the allocator, the allocator can call 704 the standard allocator (e.g., standard_alloc(size)), or an alternate allocator, to perform the allocation for the size. After calling the standard, or alternate allocator to service the allocation, the allocator can return 705.

In one embodiment, the allocator can preserve a small amount of global metadata to track the active and free partitions within the reserved allocation range. For example, the allocator can define a matrix of pointers to hold the base address of each lane and magazine (e.g., lane_base[L,M]), a matrix of integers to track the highest allocated extent for each lane and magazine (e.g., lane_extent[L,M]), a matrix of pointers to the next free partition for each lane and magazine (e.g., bump_ptr[L,M]), and a matrix of queues which contain pointers to each free partition for each lane and magazine (e.g., free_queue[L,M]). An embodiment of the allocator can use the defined matrices to track allocation data that is not encoded directly into the address of the allocation.

In one embodiment, after determining 702 affirmatively that the size of the requested allocation is within the range of the allocator, an operation 706 can occur to round the input size up to the next lane size, and then derive a lane parameter (e.g., "L") for the allocation. For example, an allocation request for a single bit (8 bytes) of data can be rounded up to 16 bytes for the 16-byte lane, which would place the allocation in lane 0. The allocator can also perform an operation 708 to obtain the identity of the processor core of the requesting process, and assign the index of the processor to a magazine parameter (e.g., "M").

Using the lane and matrix (e.g., L and M) parameters, the free_queue matrix can be accessed 710 to determine if a free partition is available for the lane and magazine for the allocation (e.g., determine if the queue at free_queue [L,M] is empty). If the queue is not empty, meaning that there is a partition available, the allocator can perform an operation 712 to atomically dequeue an address from free_queue[L,M], and assign the address to a pointer. An operation 716 to return pointer can then be performed. In performing an atomic dequeue operation, the allocator ensures that the free address will be removed from the free_queue in a single operation, without any other process or processor being able to intervene and interrupt the operation before it is complete. If the free queue for the lane and matrix is empty, then a new partition is produced 714.

Figure 8:
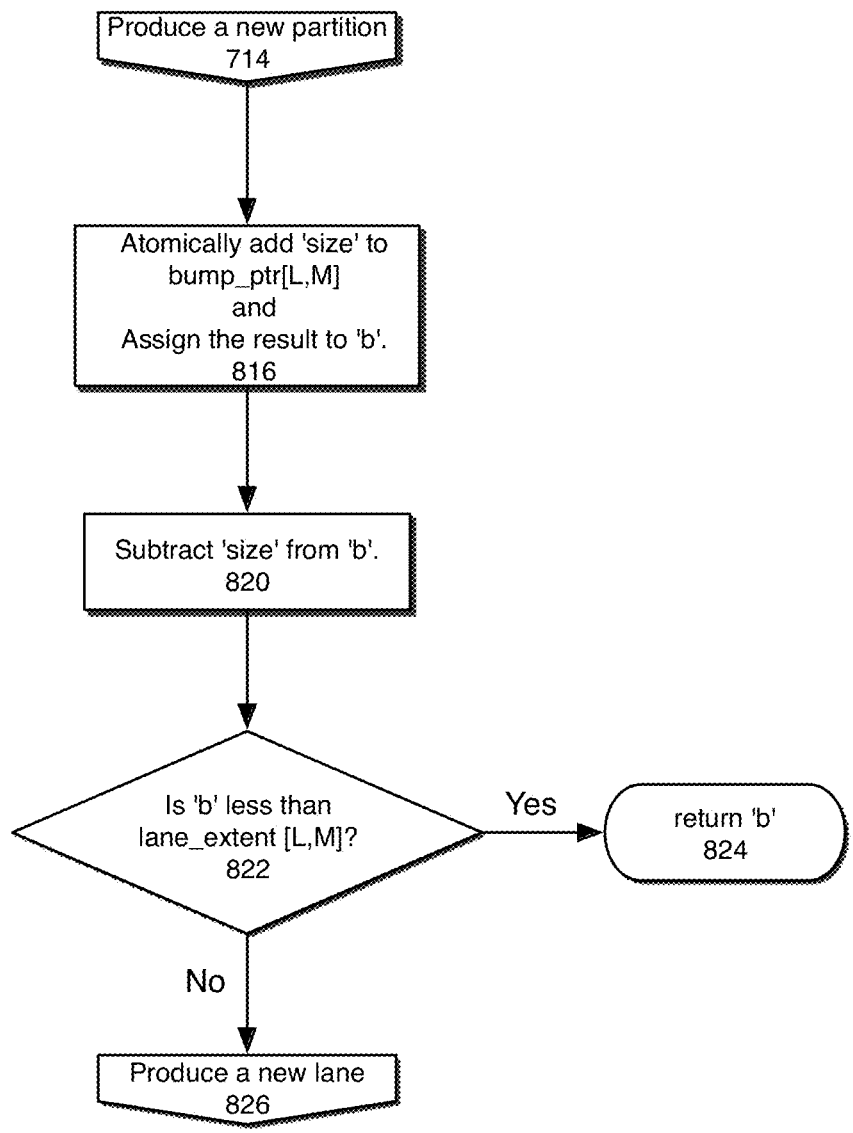
FIG. 8 is a flow diagram of metadata and user memory management when producing a new partition in a memory lane, according to an embodiment.

FIG. 8 is a flow diagram of metadata and user memory management when producing a new partition in a memory lane, according to an embodiment. In one embodiment, the allocator can perform an operation 714 to produce a new partition by performing an atomic operation 816 to add the input allocation size to the address stored at the bump_ptr[L, M] location in the bump_ptr matrix, and add the result to a value (e.g., pointer variable 'b'). In other words, an embodiment of the allocator at 816 can advance the location of the next partition pointer to the position where the next free partition can be found after consuming the available partition and assigning it to the requesting process. The outcome of operation 816 can be saved in a variable, and in operation 820, the size of the requested allocation can subtracted from the 'b' variable, and an operation 822 can be performed to determine if the stored address is within the value stored in the lane_extent matrix at location [L,M]. In other words, the allocator can determine, at 822, whether the next location pointer is still within the address range defined for the lane for the allocation. If the next address exceeds the address range for the lane, an operation 826 can be performed to produce a new lane. If the address for the next partition within the lane is determined at 822 to be validly within the lane, then an operation 824 can be performed to return the address stored (e.g., the address stored in the variable 'b') as the pointer for the requested allocation.

Figure 9:
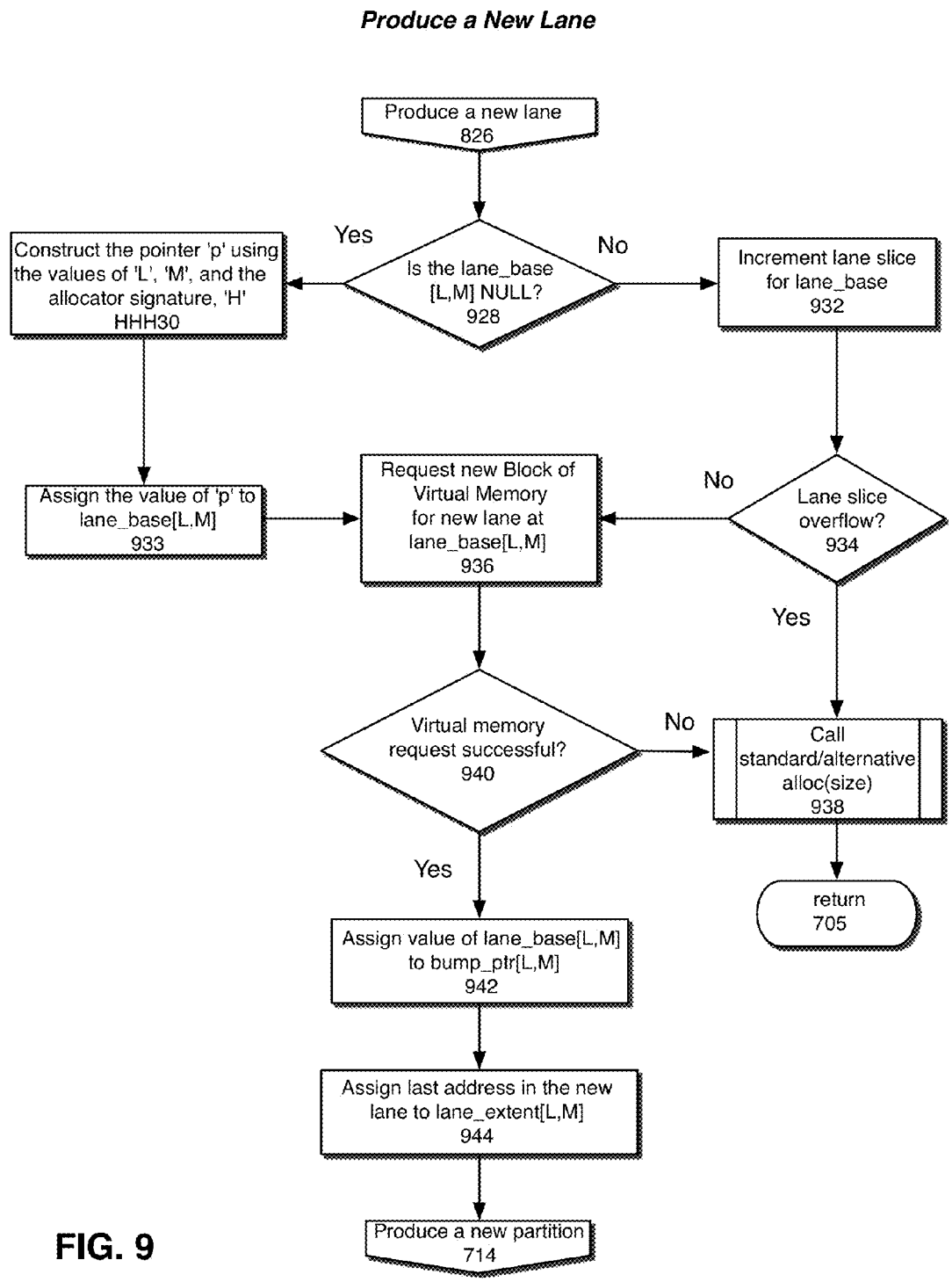
FIG. 9 is a flow diagram of metadata management and user memory management when producing a new memory lane, according to an embodiment.

FIG. 9 is a flow diagram of metadata management and user memory management when producing a new memory lane, according to an embodiment. In one embodiment, the allocator can perform an operation 826 to produce a new memory lane by first performing an operation 928 to determine if the address at the [L,M] location of the lane_base matrix is a NULL address, meaning the lane has not yet been allocated virtual memory space. If lane_base[L,M] is determined to be null during operation 928, an operation 930 to construct a pointer variable (e.g., pointer 'p') using the lane, magazine and allocator signature values. An operation 933 assigning the value of the pointer variable to the lane_base[L,M], to set the virtual memory pointer for the base address of the new lane can be followed by an operation 936 to request a new block of virtual memory from the operating system for the new lane, the block of virtual memory including the new lane at lane_base[L,M]. In one embodiment, the new block of Virtual Memory is sufficiently large to encompass a complete set of lanes for the allocator range, such that new lanes within this block of memory can be allocated without requesting a new block of virtual memory.

When a block of virtual memory has been previously allocated for the lane, meaning that at operation 928 it is determined that the value at lane_base[L,M] is not NULL, the lane_slice bitfield value (e.g., Lane Slice 506 of FIG. 5) is incremented at operation 932 to indicate that a new slice of lanes is active. If the operation 932 which increments the lane slice value for the lane_base is determined at operation 934 to have caused a lane slice overflow, then an operation 938 to call the standard, or, in one embodiment, an alternate allocator, can be performed, as the available slices for the desired lane have all been allocated. Subsequently, a return operation 705 can be performed. If the lane slice bitfield has not overflowed, meaning that additional slices for the requested lane can be allocated, then logic flow proceeds to operation 936, where a new block of virtual memory for the lane is requested from the operating system.

In one embodiment, an operation 940 can be performed to determine if the request from the operating system for additional virtual memory is successful, and if the request fails, a call 938 to the standard, or, in one embodiment, an alternate allocator can be performed. Should the virtual memory request return successfully, and operation 942 to assign the value of the address at lane_base[L,M], to bump_ptr[L,M]. In other words, the address of base address of the new lane in the selected magazine is assigned to the matrix element containing the next free partition for the lane and magazine. Additionally, an operation 944 can be performed which assigns the last valid address within the new lane to the element defined by the lane and magazine value in the lane_extent matrix. In one embodiment, when a new lane with a valid base address and a valid extent value is defined, the allocator can return to the new partition operation 714.

Figure 10:
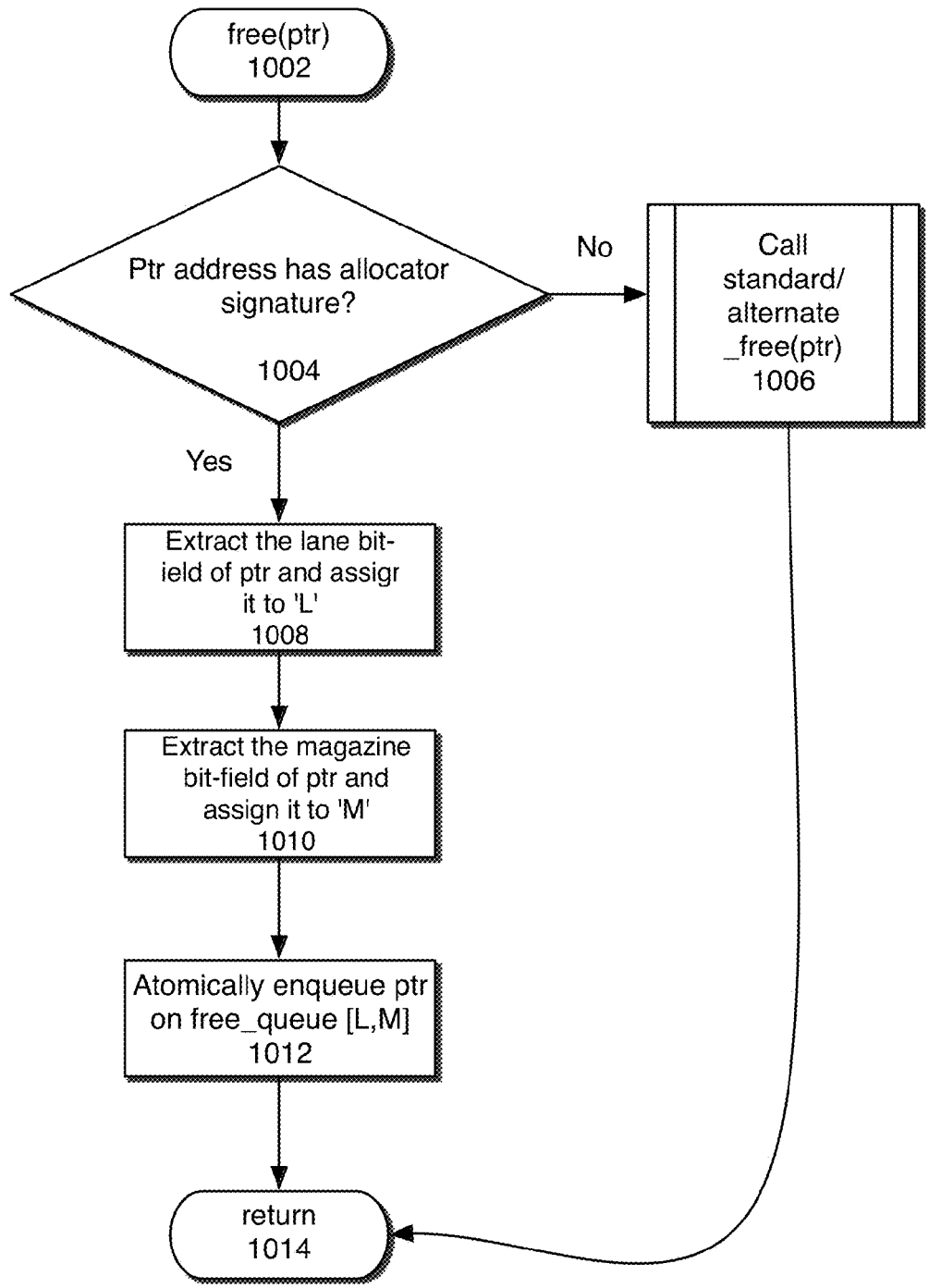
FIG. 10 is a flow diagram of metadata management and user memory management when processing a request to free an allocated pointer, according to an embodiment.

FIG. 10 is a flow diagram of metadata management and user memory management when processing a request to free an allocated pointer, according to an embodiment. An embodiment can receive a request 1002 to free an allocated pointer, and then perform an operation 1004 to determine if the pointer address has the signature of the allocator. If it is determined at operation 1004 that the pointer to be freed does not have the signature of the allocator, meaning that the allocator did not allocate the memory partition indicated by the pointer, then an operation 1006 can be performed to call the standard free operation, or the alternate allocator responsible for the allocation indicated by the pointer.

If it is indicated at operation 1004, that the pointer to be freed has the signature of the allocator, an embodiment can perform an operation 1008 to extract the lane bit field of the pointer and assign the lane value to a variable, such as the 'L' variable. Sequentially or in parallel, an operation 1010 can extract the magazine bit-field from the input pointer and assign the value to a variable, such as the 'M' variable. Once the lane and magazine are determined, the allocator can perform operation 1012, to atomically enqueue the pointer into the free_queue matrix at the element indicated by the lane and the magazine (e.g., the L and the M variables). Once the pointer to be freed is added to the free_queue at the appropriate position, the allocator can return 1014 from the free function.

It will be evident that various modifications can be made thereto without departing from the broader spirit and scope of the invention as set forth in the following claims. The specification and drawings are, accordingly, to be regarded in an illustrative sense rather than a restrictive sense. The present invention can relate to an apparatus for performing one or more of the operations described herein. This apparatus can be specially constructed for the required purposes, or it can comprise a general-purpose computer selectively activated or reconfigured by a computer program stored in the computer.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method at a memory manager for managing memory allocations in a data processing system, the method comprising:
   requesting a block of memory from a reserved address range, to allocate memory to a process;
   dividing the block of memory into a set of memory lanes;
   receiving an allocation request for a chunk of memory, wherein the chunk of memory has a size within a size-range of a first allocator of the memory manager; and
   assigning a partition of a lane from the set of memory lanes to the process, wherein a virtual memory address of the partition defines allocation metadata associated with the lane, wherein the allocation metadata includes a lane identifier for the lane of the block of memory used to service the allocation request and a lane slice identifier.

2. The method of claim 1, wherein the allocation metadata includes a processor index for a processing device of the data processing system.

3. The method of claim 1, wherein the size-range of the first allocator of the memory manager is determined by metrics including a frequency of a set of memory allocations during a workload on the data processing system.

4. The method of claim 3, wherein the size-range of the first allocator is adjustably determined by the metrics.

5. The method of claim 3, wherein the size-range is between 1 byte and 256 bytes, and the block of memory is evenly divided into 16 lanes.

6. The method of claim 1, wherein the allocation request for the chunk of memory is handled using per-chunk metadata by a second allocator of the memory manager when the size of the allocation request is outside of the size-range of the first allocator.

7. The method of claim 1, wherein assigning the partition of the lane from the set of memory lanes to the process includes constructing a pointer to the partition of the lane using a set of allocation metadata including a processor index, a lane identifier, and a signature of the memory manager.

8. A non-transitory computer-readable medium storing instructions executable by one or more processor devices to perform operations including the method of claim 7.

9. A non-transitory computer-readable medium storing instructions executable by one or more processor devices, to perform operations at a memory manager in a data processing system, the operations comprising:
receiving an allocation request for an allocation of a size within an allocator size-range;
rounding the size of the allocation to a rounded size equal to the size of a memory lane that is larger than the size of the allocation, and deriving a lane value from the rounded size;
obtaining an index of a requesting processor of the allocation; and
atomically dequeuing an address from a queue of free lane partitions, the queue of free lane partitions comprising a set of pointers to a free partition of a memory lane, partition having a memory address including the lane value, the index of the requesting processor, and a signature of the memory manager.

10. The non-transitory computer-readable medium of claim 9 storing additional instructions to perform further operations comprising returning a pointer to the allocation, the pointer including the address dequeued from the queue of free lane partitions.

11. The non-transitory computer-readable medium of claim 10 storing additional instructions to perform further operations, the operations comprising producing a new partition of the memory lane when a queue of free partitions for the memory lane and magazine is empty, and producing a new memory lane when the memory lane is full.

12. The non-transitory computer-readable medium of claim 11 storing instructions to perform further operations comprising requesting a new block of virtual memory when producing the new memory lane, and allocating the new memory lane in the new block of virtual memory.

13. The non-transitory computer-readable medium of claim 9 storing additional instructions to perform further operations comprising:
receiving a request from a process to free a memory allocation indicated by a pointer having the signature of the memory manager;
determining the memory lane of the memory allocation from the pointer;
determining the index of the requesting processor from the pointer; and
atomically enqueuing the pointer onto a free queue corresponding to the memory lane and the index of the requesting processor.

14. A data processing system comprising:
a processing device having multiple 64-bit processor cores; and
a non-transitory memory device storing instructions for execution by the processing device, the instructions to cause the processing device to perform operations for handling memory allocations, the operations to,
pre-reserve a set of memory addresses in an address range,
request a block of memory from an operation system of the data processing system, the block of memory having an address in the set of memory addresses, to service a memory allocation request from a process,
divide the block of memory into a set of memory lanes, and
assign a partition of a memory lane from the set of memory lanes to the process, wherein the address of the partition defines allocation metadata associated with the memory lane, the allocation metadata including an index for a processor core of the processing device, a memory lane identifier for the memory lane of the block of memory used to service the memory allocation request, and an offset of the partition within the memory lane.

15. The data processing system of claim 14 further comprising additional instructions to cause the processing device to,
receive the memory allocation request for an allocation of a size within an allocator size-range,
round the size of the allocation to a rounded size equal to the size of the memory lane that is larger than the size of the allocation,
derive a lane value from the rounded size,
obtain the index of the processor core of the allocation, and
return a pointer having the address of a free partition when the free partition is available for the index of the processor core and the memory lane.

16. The data processing system of claim 15, wherein the allocator size-range is between 1 byte and 256 bytes, and the block of memory is evenly divided into 16 lanes.

17. The data processing system of claim 16, wherein the allocator size-range is determined by metrics including a frequency of a set of memory allocations during a workload on the data processing system.

18. The data processing system of claim 17, wherein the allocator size-range is adjustably determined by the metrics.

19. The data processing system of claim 18, wherein the instructions cause the processing device to create multiple memory managers, each memory manager having a unique allocator size-range and signature.

20. The data processing system of claim 14, wherein the instructions cause the processing device to perform further operations,
receive a free memory request from the process to free a memory allocation indicated by a pointer to an allocation, the address of the allocation having an allocator signature,
determine the memory lane of the memory allocation from the pointer,
determine the index of a requesting processor from a processor index of the pointer, and
atomically enqueue the pointer onto a free queue corresponding to the memory lane and the processor index.

21. A non-transitory computer-readable medium storing instructions which, when executed by one or more processors of a data processing system, cause the one or more processors to perform operations comprising:
requesting a block of memory from a reserved address range for allocation to a process;
dividing the block of memory into a set of memory lanes;
receiving an allocation request for a chunk of memory, wherein the chunk of memory has a size within a size-range of a first allocator of a memory manager; and
assigning a partition of a lane from the set of memory lanes to the process, wherein a virtual memory address of the partition encodes allocation metadata associated with the lane, the allocation metadata including a lane identifier for the lane of the block of memory used to service the allocation request.

22. The medium as in claim 21, additionally including instructions to perform additional operations including pre-reserving the reserved allocation range based on an assignment between bits of the memory address and the bits of the allocation metadata.

* * * * *